United States Patent [19]
Ford et al.

[11] Patent Number: 5,436,299
[45] Date of Patent: Jul. 25, 1995

[54] DECARBONYLATION OF N-VINYLFORMAMIDE COPOLYMERS

[75] Inventors: Michael E. Ford, Coopersberg; John N. Armor, Orefield, both of Pa.

[73] Assignee: Air Products and Chemicals, Inc., Allentown, Pa.

[21] Appl. No.: 359,487

[22] Filed: Dec. 20, 1994

[51] Int. Cl.⁶ .................................................. C08F 8/12
[52] U.S. Cl. ............................ 515/370; 525/328.2; 525/371
[58] Field of Search .............................. 525/370, 371

[56] References Cited

U.S. PATENT DOCUMENTS

| | | | |
|---|---|---|---|
| 4,255,548 | 3/1981 | Wingard, Jr. et al. | 525/328.2 |
| 4,393,174 | 7/1983 | Dawson et al. | 525/369 |
| 4,421,602 | 12/1983 | Brunnmueller et al. | 162/168.2 |
| 4,774,285 | 9/1988 | Pfohl et al. | 525/60 |
| 4,798,871 | 1/1989 | Lai et al. | 525/328.2 |
| 4,808,683 | 2/1989 | Itagaki et al. | 526/307.2 |
| 4,921,621 | 5/1990 | Costello et al. | 252/8.513 |
| 4,943,676 | 7/1990 | Pinschmidt, Jr. et al. | 525/383 |
| 4,952,656 | 8/1990 | Lai et al. | 525/328.2 |
| 4,957,977 | 9/1990 | Itagaki et al. | 525/328.4 |
| 5,037,927 | 8/1991 | Itagaki et al. | 526/307.7 |
| 5,064,909 | 11/1991 | Itagaki et al. | 525/340 |
| 5,281,340 | 1/1994 | Sato et al. | 210/734 |
| 5,290,880 | 3/1994 | Moench et al. | 525/328.2 |
| 5,391,710 | 2/1995 | Ford | 525/328.2 |

FOREIGN PATENT DOCUMENTS 61-118406  6/1986  Japan .

OTHER PUBLICATIONS

Colquhoun et al. *Carbonylation.* New York, N.Y.: Plenum Press. 1991: 207–225.

Wender, et al., ed. *Organic Syntheses via Metal Carbonyls.* New York, N.Y.: Wiley–Interscience, vol. 2., 1977: 630.

Kotachi, et al. "Ruthenium Complex–Catalyzed Synthesis of Carbamates by Dehgydrogenative Reaction of Formamides with Alcohols." *Catalysis Letters* (19), 1933: 339–344.

*Primary Examiner*—Bernard Lipman
*Attorney, Agent, or Firm*—Mark L. Rodgers; William F. Marsh

[57] ABSTRACT

Salt-free vinylamine copolymers are formed by heating the corresponding N-vinylformamide copolymer to a temperature from about 75° to 225° C. in non-aqueous media in the presence of a catalyst comprising a Group VIII metal.

8 Claims, No Drawings

DECARBONYLATION OF N-VINYLFORMAMIDE COPOLYMERS

TECHNICAL OF THE INVENTION

The Present Invention Relates To The Synthesis Of Copolymers Of Poly(Vinylamine).

BACKGROUND OF THE INVENTION

Owing to the tautomeric instability of vinylamine, poly(vinylamine) (pVA) and vinylamine copolymers are made indirectly by (co)polymerization of a derivative of vinylamine, such as N-vinylformamide, and subsequent removal of the derivatizing group. Previous methods for conversion of poly(N-vinylformamide) (pNVF) or analogous polymeric intermediates to pVA entail hydrolysis with either strong base (U.S. Pat. No. 4,393,174) or acid (U.S. Pat. No. 4,808,683). Japan Kokai Tokkyo Koho, Jp 61 118406 (1984) discloses the preparation of pVA by treatment of pNVF with a mixture of aqueous ammonia or alkylamine at room temperature, followed by hydrolysis with aqueous sodium or potassium hydroxide.

U.S. Pat. No. 4,421,602 discloses the production of copoly(N-vinylformamide vinylamine) by reaction of pNVF with acid or base. Aqueous sodium or potassium hydroxides are preferred and the use of ammonia or amines is disclosed, but not exemplified. In the latter instance, removal of formamide groups as the corresponding monomeric formamides is indicated. In each case, inorganic coproducts are formed in conjunction with pVA; base hydrolysis leads to alkali metal salts of the derivatizing group (e.g., sodium or potassium formate), while acid hydrolysis gives the corresponding salt of pVA and formic acid. Neutralization provides pVA, accompanied by a salt of the acid used for hydrolysis and (unless formic acid was removed) a formate salt. Although some applications of pVA are insensitive to the presence of inorganics, many, including those in adhesives and coatings, require essentially salt-free pVA. Separation of these coproducts from pVA has been accomplished by traditional routes such as precipitation, selective extraction, or ultrafiltration. In all instances, however, preparation of salt-free pVA entails tedious removal and disposal of stoichiometric quantities of an inorganic coproduct.

Similar hydrolytic procedures have also been used to generate amine functional copolymers from the corresponding NVF copolymers. However, partial conversion of any additional hydrolytically labile functionality in the copolymer is often observed. Thus, hydrolysis of copolymers of NVF with (meth)acrylamides (U.S. Pat. No. 4,808,683), (meth)acrylonitrile (U.S. Pat. Nos. 4,957,977 and 5,064,909), or (meth)acrylates (U.S. Pat. No. 5,037,927) under acidic conditions yields amine functional polymers which also contain carboxylate groups. U.S. Pat. No. 4,921,621 reports comparable results with basic hydrolyses of NVF-acrylamide copolymers. U.S. Pat. No. 5,281,340 discloses amidine-containing polymers which are the products of acidic hydrolysis of NVF(meth)acrylamide copolymers. U.S. Pat. No. 4,774,285 discloses water soluble polymers which are obtained by hydrolysis of copolymers of NVF with a variety of comonomers, e.g., vinyl esters, N-vinylpyrrolidinone, (meth)acrylates, under strongly acidic or basic conditions. Copolymerized vinyl esters are also hydrolyzed, especially under basic conditions.

U.S. Pat. No. 4,943,676 discloses the thermolysis of pNVF as a route to pVA. High temperatures (>200° C.) are required, conversions to pVA are low to moderate, and difficultly soluble, crosslinked products are obtained. While the last disadvantage may be overcome by inclusion of water, the resulting products still contain formate salts.

H. M. Colquhoun, et al, "Carbonylation", Plenum Press, New York, 1991, pp 207-225 report transition metal-mediated decarbonylations, especially of aromatic substrates. Aromatic aldehydes are decarbonylated catalytically by treatment with Pd/C at high temperature (the boiling point of the aldehyde, typically >200° C.). Poor selectivities are often obtained, owing to functional group sensitivity under the reaction conditions. Stoichiometric decarbonylations of aromatic aldehydes have been done with "Wilkinson's catalyst" [chlorotris(triphenylphosphine)rhodium]under mild conditions; however, the starting rhodium complex must be regenerated in a separate step. Cationic rhodium complexes of bridging diphosphines may be used for catalytic decarbonylation of aromatic aldehydes. The latter catalysts are extremely sensitive, and are active only under rigorously anhydrous and anaerobic conditions. Attempted extension of both stoichiometric and catalytic decarbonylations to aliphatic aldehydes is further complicated by multiple reaction pathways and extensive byproduct formation via $\beta$-elimination and/or isomerization of organometallic intermediates. Attempted decarbonylations of carboxylic acid derivatives have met with less success. Treatment of aroyl chlorides with stoichiometric quantities of "Wilkinson's catalyst" yields arylrhodium complexes; (chloro)arenes are not formed at temperatures <200° C. Catalytic decarbonylation of aroyl halides has been accomplished with this complex under forcing conditions (200°-300° C.); selectivity to desired products may again be an issue. Poor selectivity is encountered with aliphatic acid chlorides as the result of $\beta$-elimination and/or isomerization. Consequently, although catalytic carbonylation of monomeric amines to produce formamides and/or ureas has been demonstrated, the reverse process is virtually unknown.

Palladium(II) chloride - catalyzed decarbonylation of monomeric formamides is mentioned qualitatively and very briefly in a monograph "Organic Synthesis via Metal Carbonyls" ed. I Wender and P. Pino, Wiley-Interscience, New York, Vol. 2, 1977, p. 630, however, no further detail has appeared in the literature. S. Kotachi, et al, Catal. Lett., 19, 339-334 (1933) observed decarbonylation of formanilide as a competing pathway in the production of carbamates from alcohols and formanilide with homogeneous ruthenium catalysts. Catalytic decarbonylation of pNVF or NVF copolymers, however, has not been reported in either the journal or patent literature.

SUMMARY OF THE INVENTION

The present invention provides a process for converting an N-vinylformamide copolymer to the corresponding vinylamine copolymer. The process comprises heating an N-vinylformamide copolymer to a temperature of from about 75° to 225° C. in nonaqueous media in the presence of a catalyst comprising a Group VIII metal in a non-zero valence state. The reaction mixture is subsequently cooled and vented to yield the vinylamine copolymer.

The present process is advantageous over prior decarboxylation techniques in that the reaction is carried out in a single step without the need for adding water or hydrolytic reagents. Additionally, since this process provides for essentially salt-free hydrolysis, the subsequent removal of coproduct salts is not required.

DETAILED DESCRIPTION OF THE INVENTION

A process is provided for making essentially salt-free vinylamine copolymers from the corresponding N-vinylformamide (NVF) copolymers. In accordance with this process, an N-vinylformamide copolymer is heated in non-aqueous media in the presence of a catalyst comprising a Group VIII metal. As used herein, the term "Group VIII metal" refers to the current CAS version of the Periodic Table of the elements; i.e., to the group composed of iron, nickel, cobalt, ruthenium, rhodium, palladium, osmium, iridium and platinum. The reaction is allowed to proceed for about 0.25 to 10 hours after which the reaction mixture is cooled and vented to yield the corresponding vinylamine copolymer.

The present process is suitable for treatment of a wide variety of N-vinylformamide copolymers, however, homopolymers of N-vinylformamide, as well as copolymers which only contain amides other than NVF do not work well in this process. Examples of suitable copolymers of NVF include: copoly(N-vinylpyrrolidinone-NVF), copoly(acrylamide-NVF), copoly(vinyl acetate-NVF), copoly(vinyl alcohol-NVF) and the like. The concentration of NVF in the copolymer can range from about 2 to 80 mole % based upon the total polymer, with from about 4 to 50 mole % being preferred. Additionally, the copolymers may be block, alternating, or random copolymers. The molecular weight of the copolymer is generally not important and can range from low, i.e. about 50,000 to very high, i.e. 900,000 or greater.

The N-vinylformamide copolymer is heated in non-aqueous media to a temperature from about 75° to 225° C. in the presence of a catalyst comprising a Group VIII metal. The non-aqueous media should be chosen such that the starting copolymer is at least partially soluble in the media. Examples of suitable non-aqueous media include N-methylpyrrolidinone, acetamide, N,N-dimethyl acetamide, 1,3-dimethyl-3,4,5,6,-tetrahydro-2(1H) -pyrimidin hexamethyl phosphorous triamide. Alcohols, such as methanol are also suitable. The catalyst can comprise any Group VIII metal or metal complex, including oxidized metals, in a non-zero valence state, i.e., a Group VIII metal salt, with palladium, rhodium and ruthenium generally being preferred. Typically, the catalyst is present in a concentration of from about 5 to 70 mole % based upon concentration of the N-vinylformamide copolymer. Optionally, the Group VIII metal may be present on a support such as barium sulfate, silica, alumina, silica/alumina, titania, and the like. The reaction may be carried out as either a batch or a continuous process. In the case of a batch process, the reaction is typically carried out for between 0.25 to 10 hours with from about 1 to 3 hours being preferred, after which the reactor is vented to remove byproduct gases, such as carbon monoxide, and cooled to yield the vinylamine copolymer. Optionally, the effluent gas may be recovered or treated prior to venting.

Conversion of NVF in the copolymer to the corresponding vinylamine typically ranges from about 15 to 100%, with at least 25% conversion being preferred.

In contrast to the prior art, the present process converts NVF copolymers to the corresponding salt-free vinylamine copolymers in a single step. Neither addition of water or hydrolytic reagents, nor removal of coproduct salts is required.

The following examples were carried out to better illustrate the present invention and are not meant to be limiting.

EXAMPLES 1-19

Preparations of copoly(N-vinylpyrrolidinone - vinylamine) were carried out with the following general procedure. Dry, powdered copoly(N-vinylpyrrolidinone - N-vinylformamide) was added to a 50 or 100 mL stainless steel Parr reactor, dissolved in N-methylpyrrolidinone, and the desired Group VIII metal catalyst added. The reactor was sealed and pressure checked with nitrogen at 500–600 psig. Stirring was started, and the mixture heated to the desired temperature for the desired length of time. Subsequent cooling to room temperature and venting (carbon monoxide) provided the product. Samples were analyzed by $^1$H and $^{13}$C NMR. Typically, partial conversion of NVF to vinylamine was found with varying concentrations of unchanged pendant formamide.

The specific catalysts used and the specific reaction conditions as well as the results for each run are set out in Table I below.

TABLE 1

| Catalytic Decarbonylation of Copoly(N-vinylpyrrolidinone-N-vinylformamide)[a] | | | | | | |
|---|---|---|---|---|---|---|
| | Catalyst | | | | Selectivity[d] | |
| Run | (Wt %)[b] | T (°C.) | t (hr) | Conv (%)[c] | pNVF | pVA | Amidine |
| 1 | PdCl$_2$(DPE)[e] (6.4) | 200 | 2 | 19 | 81 | 19 | f |
| 2 | PdCl$_2$ (6.4) | 200 | 2 | 57 | 43 | 57 | f |
| 3 | Pd(OAc)$_2$ (8.2) | 200 | 2 | 46 | 54 | 46 | f |
| 4 | Pd(OCOCF$_3$)$_2$ (12) | 200 | 2 | 18 | 82 | 18 | f |
| 5 | Pd(acac)$_2$[g] (11) | 200 | 2 | 25 | 75 | 25 | f |
| 6 | RUCl$_3$.3H2O (6.4) | 200 | 4 | 67 | 33 | 67 | f |
| 7 | h | 200 | 4 | 69 | 31 | 69 | f |
| 8 | Ru(CO)$_2$OAc (6.4) | 200 | 4 | 67 | 33 | 67 | f |
| 9 | 14062-20-3[i] (27.6) | 200 | 2 | 39 | 56 | 34 | 10 |
| 10 | 14062-21-1[j] (25.4) | 200 | 4 | 34 | 66 | 34 | f |
| 11 | 14062-59[k] (28.0) | 150 | 6 | 22 | 75 | 19 | 6 |
| 12 | 14062-60[l] (28.1) | 200 | 2 | 35 | 65 | 35 | f |
| 13 | 14062-81[m] (28.1) | 200 | 2 | 36 | 64 | 36 | f |
| 14 | 14062-78[n] (26.4) | 200 | 2 | 25 | 75 | 25 | f |
| 15 | 14062-73[o] (39.3) | 150 | 6 | 15 | 85 | 15 | f |
| 16 | 14062-94-1[p] (63.0) | 150 | 6 | 15 | 85 | 15 | f |
| 17 | 14062-72[q] (17.9) | 100 | 6 | 18 | 82 | 18 | f |
| 18 | 14343-7[r] (52.9) | 200 | 2 | 24 | 76 | 14 | 10 |

TABLE 1-continued

| 19 | 14062-59[k,r] | 150 | 6 | 29 | 71 | 29 | — |

Notes to Table 1

[a]All reactions carried out with 2.85 gm copoly(N-vinylpyrrolidinone-NVF) in 20 mL N-methylpyrrolidinone unless otherwise specified.

[b]Wt % catalyst (dry basis), based on weight of copoly(N-vinylpyrrolidinone-NVF).

[c]Mole % of formamide groups reacted; balance remains as pendant formamide.

[d]Mole % of NVF - derived functionality in isolated polymer; copolymerized N-vinylpyrrolidinone was unchanged.

[e]Dichloro[1,2-bis(diphenylphosphino)ethane]palladium(II).

f Not detected.

[g]Palladium(II) acetylacetonate.

[h]Mixture of ruthenium trichloride trihydrate (6.4 wt %, based on copolymer substrate) and triphenylphosphine (16 wt %, based on copolymer substrate).

[i]Notebook reference for catalyst prepared by exchanging dichlor[1,2-bis(diphenyl-phosphino)ethane]palladium(II) (4.34 gm) into montmorillonite (Clarion C, 5.0 gm). The resulting catalyst contained 14.27 atom % palladium (ignited basis).

[j]Notebook reference for catalyst prepared by exchanging chlorotris(triphenyl-phosphine)rhodium(I) (3.49 gm) onto montmorillonite (Clarion C, 2.5 gm). The resulting catalyst contained 6.42 atom % palladium (ignited basis).

[k]Notebook reference for catalyst prepared by impregnation of palladium(II) chloride (0.25 gm) onto silica alumina (Davison 980, 5.0 gm, incipient wetness technique). The resulting catalyst contained 2.92 atom % palladium (ignited basis).

[l]Notebook reference for catalyst prepared by impregnation of palladium(II) chloride (0.25 gm) onto silica alumina (KDC-6, 5.0 gm, incipient wetness technique). The resulting catalyst contained 2.63 atom % palladium (ignited basis).

[m]Notebook reference for catalyst prepared by impregnation of palladium(II) chloride (0.25 gm) onto silica alumnia Davison 970, 5.0 gm, incipient wetness technique). The resulting catalyst contained 2.89 atom % palladium (ignited basis).

[n]Notebook reference for catalyst prepared by exchanging palladium(II) nitrate (1.74 gm) onto montmorillonite (Engelhard F160, 5.0 gm). The resulting catalyst contained 15.21 atom % palladium (ignited basis).

[o]Notebook reference for catalyst prepared by exchanging dichlorodicarbonylbis(tri-phenylphosphine)ruthenium(II) (5.64 gm) onto montmorillonite (Clarion C, 5.0 gm). The resulting catalyst contained 9.05 atom % ruthenium (ignited basis).

[p]Notebook reference for catalyst prepared by impregnation of ruthenium(III) acetylacetonate (0.25 gm) onto silica alumina (Davison 980, 5.0 gm, incipient wetness technique). The resulting catalyst contained 1.17 atom % ruthenium (ignited basis).

[q]Notebook reference for catalyst prepared by exchanging ruthenium carbonyl acetate polymer (5.19 gm) onto Amberlyst A21 (5.0 gm). The resulting catlyst contained 4.56 meq/gm of ruthenium.

[r]Notebook reference for catalyst prepared by exchanging dichloro[1,2-bis(diphenyl-phosphino)ethane]palladium(II) (4.35 gm) onto montmorillonite (Engelhard F160, 5.0 gm). The resulting catalyst contained 14.36 atom % palladium (ignited basis).

[s]Reaction carried out in 20 ml methanol

Runs 1-8 demonstrate decarbonylation of copoly(N-vinylpyrrolidinone - N-vinylformamide) with a variety of Group VIII metal complexes. Best conversions were obtained with ruthenium compounds (runs 6-8). Of the palladium complexes examined, palladium(11) chloride (run 2) and palladium(11) acetate (run 3) provided moderate conversions. Catalytic decarbonylation with supported Group VIII metal complexes is shown by runs 9-19. Somewhat lower conversions were obtained, probably as a result of mass transfer limitations between the solution and the catalyst surface. In contrast to the activities observed with homogeneous catalysts, best conversions with supported catalysts were obtained with palladium(11) chloride on silica alumina (runs 12, 13); Wilkinson's catalyst exchanged onto montmorillonite also provided similar results (run 10). In the above reactions, loadings of catalysts were chosen to maintain a 12/1 equivalence ratio of copolymerized NVF/Group VIII metal complex.

EXAMPLES 20-21

The decarbonylation process described above was carried out using copoly(vinyl acetate - 12% NVF) (Example 20) and also copoly(vinyl alcohol- 12% NVF) (Example 21 ). In both instances, palladium chloride on silica alumina was used. Loadings of catalysts were chosen to maintain a 23/1 equivalence ratio of copolymerized NVF/Group VIII metal complex. Additionally, both runs were carried out at 150° C. for 6 hours. Reaction conditions and results for these two runs are reported in Table 2 below.

TABLE 2

Catalytic Decarbonylation of NVF Copolymers[a]

| Run | Copolymer (wt % NVF) | Catalyst (wt %)[b] | Conv (%)[c] | Selectivity[d] pNVF | pVA | Amidine |
|---|---|---|---|---|---|---|
| 20 | Copoly(vinyl acetate-NVF) (1 2) | 14062-59[e] (26.7) | 52 | 48 | 52 | f |
| 21 | Copoly(vinyl alcohol- | 14062-59[e] (26.7) | 100 | f | 100 | f |

TABLE 2-continued

| | | Catalytic Decarbonylation of NVF Copolymers[a] | | | | |
|---|---|---|---|---|---|---|
| | Copolymer | Catalyst | | | Selectivity[d] | |
| Run | (wt % NVF) | (wt %)[b] | Conv (%)[c] | pNVF | pVA | Amidine |
| | NVF) (12) | | | | | |

Notes to Table 2

[a] All reactions carried out with 3.0 gm copolymer in 20 mL N-methyl-yrrolidinone unless otherwise specified.
[b] Wt % catalyst (dry basis), based on weight of copolymer.
[c] Mole % of formamide groups reacted; balance remains as pendant formamide.
[d] Mole % of NVF - derived functionality in isolated polymer; copolymerized N-vinylpyrrolidinone was unchanged.
[e] Notebook reference for catalyst prepared by impregnation of palladium(II) chloride (0.25 gm) onto silica alumina (Davison 980, 5.0 gm, incipient wetness technique). The resulting catalyst contained 2.92 atom % palladium (ignited basis).
f Not detected.

Runs 20 and 21 demonstrate decarbonylation of two different NVF copolymers. Good to quantitative conversions were obtained. The results of these two runs clearly indicate that the present process is applicable for various copolymers of NVF, including acetates and alcohols as well as pyrrolidinones.

EXAMPLES 22–23 (Comparative)

The decarbonylation reaction described in Examples 1–19 above was carried out using copoly(N-vinylpyrrolidinone-N-vinylformamide) using palladium supported on carbon for the first run, and ruthenium supported on carbon for the second run; i.e., both metal catalysts were in the zero valence state. Catalyst loadings for both runs were maintained at 12/1 equivalence ratio of copolymerized NVF/catalyst. Both runs were carried out at 200° C. for four hours. The results obtained showed conversions of less than 5 mole % of formamide groups reacted with no significant selectivity to the corresponding amine group.

The results of these two runs clearly indicate that the Group VIII metal catalyst must be in a non-zero valence state to be suitable for these decarbonylation reactions.

EXAMPLES 24–25 (Comparative)

Attempts were made to decarbonylate pNVF homopolymers using the catalyst of run 9 above under both the same reaction time and temperature as run 9 and also at 150° C. for 4 hours. Both runs were unsuccessful in converting the pNVF homopolymers to the corresponding poly(vinylamine). These runs clearly show that the subject decarbonylation reaction is not suitable for NVF homopolymers.

Having thus described the present invention, what is now deemed appropriate for Letters Patent is set out in the following appended claims.

We claim:

1. A process for the conversion of an N-vinylformamide copolymer to the corresponding vinylamine copolymer, said process comprising heating said N-vinylformamide copolymer to a temperature of from about 75° to 225° C. in non-aqueous media in the presence of a catalyst comprising a Group VIII metal in a non-zero valence state.

2. A process in accordance with claim 1 wherein said N-vinylformamide copolymer is copoly(N-vinylpyrrolidinone-N-vinylformamide).

3. A process in accordance with claim 1 wherein said catalyst comprises a Group VIII metal selected from the group consisting of palladium, rhodium and ruthenium.

4. A process in accordance with claim 1 wherein said catalyst comprises a Group VIII metal on a support.

5. A process in accordance with claim 1 wherein said N-vinylformamide copolymer contains N-vinylformamide units and units selected from the group consisting of vinyl acetate, acrylamide and mixtures thereof.

6. A process in accordance with claim 1 which is carried out as a batch process.

7. A process in accordance with claim 6 which is carried out for a time from 0.25 to 10 hours.

8. A process in accordance with claim 1 which is carried out as a continuous process.

* * * * *